(12) United States Patent
Nagahara

(10) Patent No.: US 6,449,172 B2
(45) Date of Patent: Sep. 10, 2002

(54) SWITCHING POWER SUPPLY WITH NONLINEAR CHARACTERISTICS AT START UP

(75) Inventor: Kiyokazu Nagahara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/748,293

(22) Filed: Dec. 26, 2000

(30) Foreign Application Priority Data

Dec. 28, 1999 (JP) ............................................ 11-375323

(51) Int. Cl.[7] .............................................. H02M 3/335
(52) U.S. Cl. ........................ 363/25; 363/49; 363/56.07
(58) Field of Search ............................ 363/49, 24, 25, 363/133, 134, 56.07

(56) References Cited

U.S. PATENT DOCUMENTS

| | | | |
|---|---|---|---|
| 3,573,595 A | * 4/1971 | Galluppi | 323/312 |
| 5,532,913 A | * 7/1996 | Suzuki et al. | 363/109 |
| 6,055,162 A | * 4/2000 | Tarrillo et aL. | 363/133 |

* cited by examiner

*Primary Examiner*—Shawn Riley
(74) *Attorney, Agent, or Firm*—Jay H. Maioli

(57) ABSTRACT

A power supply apparatus includes a variable frequency oscillating circuit, a driver, a soft start circuit, switching elements for receiving a switching signal, a resonating capacitor connected at a connection point of the switching elements via a primary coil of a transformer, a rectifying circuit provided at a secondary coil of the transformer, an amplifier for comparing an output voltage, Vb obtained at the rectifying circuit and a reference voltage, Vref, a photocoupler for controlling an impedance of an oscillating element of a variable frequency oscillating circuit based on the comparison output, and a charge voltage control circuit for controlling an oscillation frequency when the variable oscillation circuit is initially driven. A frequency control signal when power is ON is made nonlinear relative to time. As a result, a change in oscillation frequency immediately after power is ON is made gentle, and a rapid change in current that flows in a primary coil is eliminated. Therefore, no over-current flows in the switching elements, damage to switching elements can be reduced more significantly than conventionally, and these switching elements can be reliably protected.

5 Claims, 6 Drawing Sheets

F I G. 4
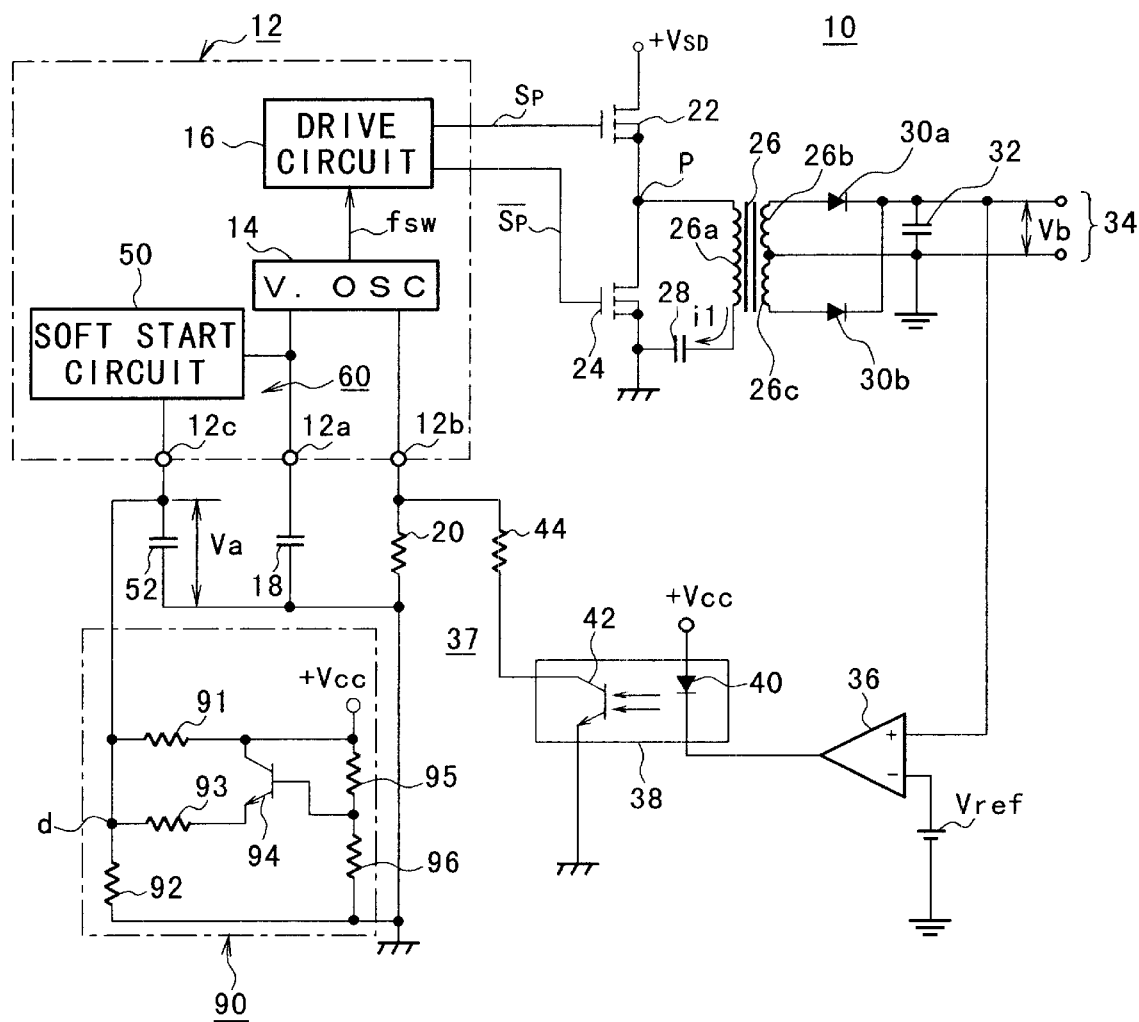

SWITCHING POWER SUPPLY WITH NONLINEAR CHARACTERISTICS AT START UP

BACKGROUND OF THE INVENTION

The present invention relates to a switching power supply apparatus. More particularly, it relates to a switching power supply apparatus in which a rectifying current that flows in a primary side of a transformer connected to a load side is formed to provide nonlinear characteristics when a power supply is started up, thereby preventing an excessive current from flowing in a switching transistor or the like provided at the primary side of the transformer.

As a switching power supply apparatus, there is known an apparatus based on a current resonance system. FIG. 1 shows a conventional example of switching power apparatus of this current resonance system, the apparatus having a SEPP (Single Ended Push Pull) arrangement.

A switching power supply apparatus 10 shown in FIG. 1 comprises switching signal generating means 12 including a variable frequency oscillating circuit 14 and a drive circuit 16. The oscillating circuit's oscillation signal is supplied to the drive circuit, thereby generating a pair of switching signals, for example, having a reverse phase relationship therebetween. In the case where the switching generating means 12 is composed of IC circuits, an oscillating element (capacitor 18 and resistor 20) that determines an oscillation frequency is externally provided at any of external terminals 12a and 12b of this IC circuit.

A pair of switching signals Sp, Sp bar are supplied to a pair of switching elements 22 and 24 having SEPP arrangement. A MOS type electric field effect transistor or the like may be utilized as the switching elements 22 and 24. An resonating capacitor 28 is connected to both a ground and a connection neutral point 'p' between a pair of these switching elements 22 and 24 via a primary coil 26a of an insulation transformer 26.

Respective diodes 30a and 30b rectify a secondary current that flows in a pair of secondary coils 26b and 26c of the insulation transformer 26 as full-wave rectifier. The full-wave rectified current allows a smoothing capacitor 32 to be charged. Therefore, voltage 'vb' obtained at both ends 34 of the smoothing capacitor 32 is supplied to a load (not shown) as an output voltage.

The output voltage is supplied to an amplifier 36, as voltage comparison means, wherein the voltage is compared with a reference voltage, Vref Its comparison output is supplied to a photo-coupler 38 that configures inductance control means 37 provided in order to insulate the primary and secondary sides of the transformer 26. The photo-coupler 38 comprises a photodiode 40 and a phototransistor 42 that functions as a variable inductance element. A current based on the comparison output flows in this phototransistor 42.

The phototransistor 42 is connected to the external terminal 12b through a stationary resistor 44. Therefore, when the phototransistor 42 is ON, this resistor 44 and serial impedance caused by the phototransistor 42 are connected in parallel to a resistor 20, which is an oscillation element.

In this arrangement, it is known that a relationship between a resonation frequency 'f' and a resonation impedance Z of the resonating circuit on the primary side of the transformer 26 formed of its primary coil 26a and the capacitor 28 is based on upper side operation as indicated by a curve 'Lo' in FIG. 2.

In this resonating circuit, when switching frequencies of the switching signals Sp and Sp bar supplied to a pair of switching elements 22 and 24 are increased, the resonance impedance Z increases. The resonance impedance Z is lowered as the switching impedance Z is lowered. Such change in the resonance impedance Z causes a resonance current i1 that flows in the primary coil 26a to be changed. Thus, controlling this resonance current i1 allows an output voltage Vb induced at the secondary side of the transformer 26 to be controlled.

When the output voltage Vb obtained at an output terminal 34 is illustratively higher than the reference voltage Vref, the phototransistor 42 has its impedance according to the comparison output. Thus, the composite resistance of the external terminal 12b becomes smaller than a case of a simplex of the resistor 20, whereby an oscillation frequency 'fsw' increases.

When the oscillation frequency 'fsw' is increased, the resonance impedance Z determined depending on the primary coil 26a and the capacitor 28 increases. Thus, a current that flows in this primary coil 26a is limited, and its value decreases. With this decrease in current, the currents induced at the secondary coils 26b and 26c are reduced as well. As a result, a charge voltage with the capacitor 32 decreases. Namely, the output voltage Vb is controlled in the direction of the reference voltage Vref.

Conversely, when the output voltage Vb is lower than the reference voltage Vref, the impedance of the phototransistor 42 increases, and the composite resistance value at the external terminal 12b increases. Then, the variable frequency oscillating circuit 14 is controlled so that its oscillation frequency 'fsw' may be lowered. As a result, the switching frequency is lowered relevant to the switching elements 22 and 24, and the primary resonance impedance Z of the transformer 26 is lowered accordingly. This causes the resonance current to increase. When the resonance current increases, the secondary current increases as well. Thus, the charge voltage Vb with the capacitor 32 rises, and a closed loop control is performed so as to be close to the reference voltage Vref.

In the meantime, in this switching power supply apparatus 10, a large amount of resonance current flows from a time when a power supply is turned ON to a time when the capacitor 32 rises to a voltage in its constant state. Thus, this current may damage the switching elements 22 and 24.

In order to reduce such damage, there has been conventionally provided a soft start circuit 50, which functions as frequency control means 60, for limiting a resonance current during startup. This soft start circuit 50 is provided in the switching signal generating means 12. An external charging capacitor 52 is connected to an external terminal 12c arranged at this soft start circuit 50, so that charging for this capacitor 52 is started in synchronism with turning ON the power. Then, a change in charge voltage Va at this time causes a charge current of the oscillating capacitor 18, which is an oscillating element, connected to the external terminal 12a to be changed.

When a charge current with the oscillating capacitor 18 changes with an elapse of time, the oscillation frequency 'fsw' changes accordingly. This fact will be described with reference to FIGS. 3A to 3E.

FIG. 3A shows a change in charge voltage Va when and after the power is turned ON, wherein the charge characteristics are linear as indicated by line La. The variable frequency oscillating circuit 14 is changed in the oscillation frequency 'fsw' by the charge voltage Va of the capacitor 52 associated with the soft start circuit 50 connected to the oscillating circuit 14. The oscillation frequency fsw changes almost linearly as indicated by characteristic line Lb in FIG. 3B. When a charge voltage Va is zero volt, oscillation occurs at a high frequency, and the oscillation frequency 'fsw' is lowered as the charge voltage Va increases.

On the other hand, the primary resonance impedance Z is characterized by characteristic curve Lo such that the resonance impedance Z increases as a frequency increases from the resonance frequency 'fo' as shown in FIG. 2. A relationship between the impedance Z and a time is illustrated as shown in FIG. 3C. Namely, there are nonlinear characteristics that the resonance impedance Z is initially high, and then, lowers rapidly; the impedance gently changes as the charge voltage Va is close to a full charge.

As a result, there is provided nonlinear characteristics such that, although not so much primary current i1 flows in this primary resonance circuit system from a time when the power is turned ON to a predetermined time, as indicated by curve Lc in FIG. 3D, the current il increases rapidly after a certain period of time has elapsed. Accordingly, there is established a charge mode in which, although the output voltage (charge voltage) Vb of the capacitor 32 connected to the output terminals 34 is initially charged gently as indicated by the curve Ld in FIG. 3E, rapid charging is then performed. Immediately before a time 'tb' when a soft start mode terminates, the result is gentle charging; and at the time and after the time 'tb' this mode transits to a voltage control mode caused by a closed loop. In this control mode, voltage control is performed such that the reference voltage Vref is obtained as indicated by the line Le in FIG. 3E.

Thus, a rapid current ii flows in the primary resonance system until a time has come immediately before the soft start mode terminates because of an effect due to a change in the primary impedance Z. This rapid current il causes a pair of switching elements 22 and 24 an excessive stress, and thus, the switching elements 22 and 24 or the like Although a voltage change applied to a load while the power is ON depends on charge characteristics of the soft start circuit, a voltage applying state that is the most suitable to the load can be achieved if the voltage change state matching such load can be freely set. However, conventional art as described above has been such a disadvantage that flexible response cannot be made, since the charge characteristics of the soft start circuit is merely linear.

Accordingly, it is an object of the present invention to provide a switching power supply apparatus in which the charge characteristics of a capacitor connected to the soft start circuit are made gentle when the power is turned ON, whereby damage to at least the switching elements can be reduced.

SUMMARY OF THE INVENTION

In accordance with the invention, the object is accomplished in switching power supply apparatus comprising a frequency control device, preferably such as a soft start circuit and a charging capacitor, for controlling an oscillation frequency when switching signal generating device, preferably such as variable frequency oscillating circuit is initially driven. A frequency control signal of the frequency control devices is formed to provide nonlinear characteristics relevant to a time. In carrying out the present invention in one preferred mode, since the charge characteristics of the soft start circuit are made nonlinear, charging for a capacitor connected to the soft start circuit is rapidly performed when the power is ON, and then, the charging is performed gradually.

By doing this, the primary impedance Z that originally changes nonlinearly changes almost linearly. This resonance impedance Z determines the primary current i1, and thus, the excessive current of this primary current i1 is inhibited. Therefore, no excessive current flows in switching elements, and damage to these switching elements can be reduced.

In addition, an output voltage to be applied to a load, particularly a voltage change when power is ON depends on the charge characteristics of a soft start circuit. The charge characteristics are provided as charge characteristics suitable to the load, whereby more stable circuit operation can be achieved.

According to the present invention, the switching power supply apparatus involves a pair of switching elements for receiving the switching signal, a resonating capacitor connected to a connection point of a pair of these switching elements via a primary coil of a transformer, a rectifying circuit provided at a secondary side of the transformer, comparison devices, preferably such as an amplifier, for comparing an output voltage obtained at this rectifying circuit with a reference voltage, and impedance control devices, preferably such as a photo-coupler, for controlling an impedance of an oscillation element of the variable frequency oscillating circuit based on this comparison output.

The switching power supply apparatus according to the present invention is very preferable on applying it to a switching converter having a SEPP configuration or the like.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 4 is a connection diagram showing essential portions of a switching power supply apparatus embodying the present invention;

DESCRIPTION OF THE PREFERRED EMBODIMENT

Now, embodiments of the switching power supply apparatus according to the present invention will be described in detail with reference to the accompanying drawings.

According to the present invention, the charge characteristics of the soft start circuit provided as switching signal generating means are changed from linear to nonlinear, whereby a change in characteristics of the primary resonance impedance of an insulation transformer is made gentle, and thus, damage to the switching element connected to the primary side of the insulation transformer can be reduced.

Figure 5:
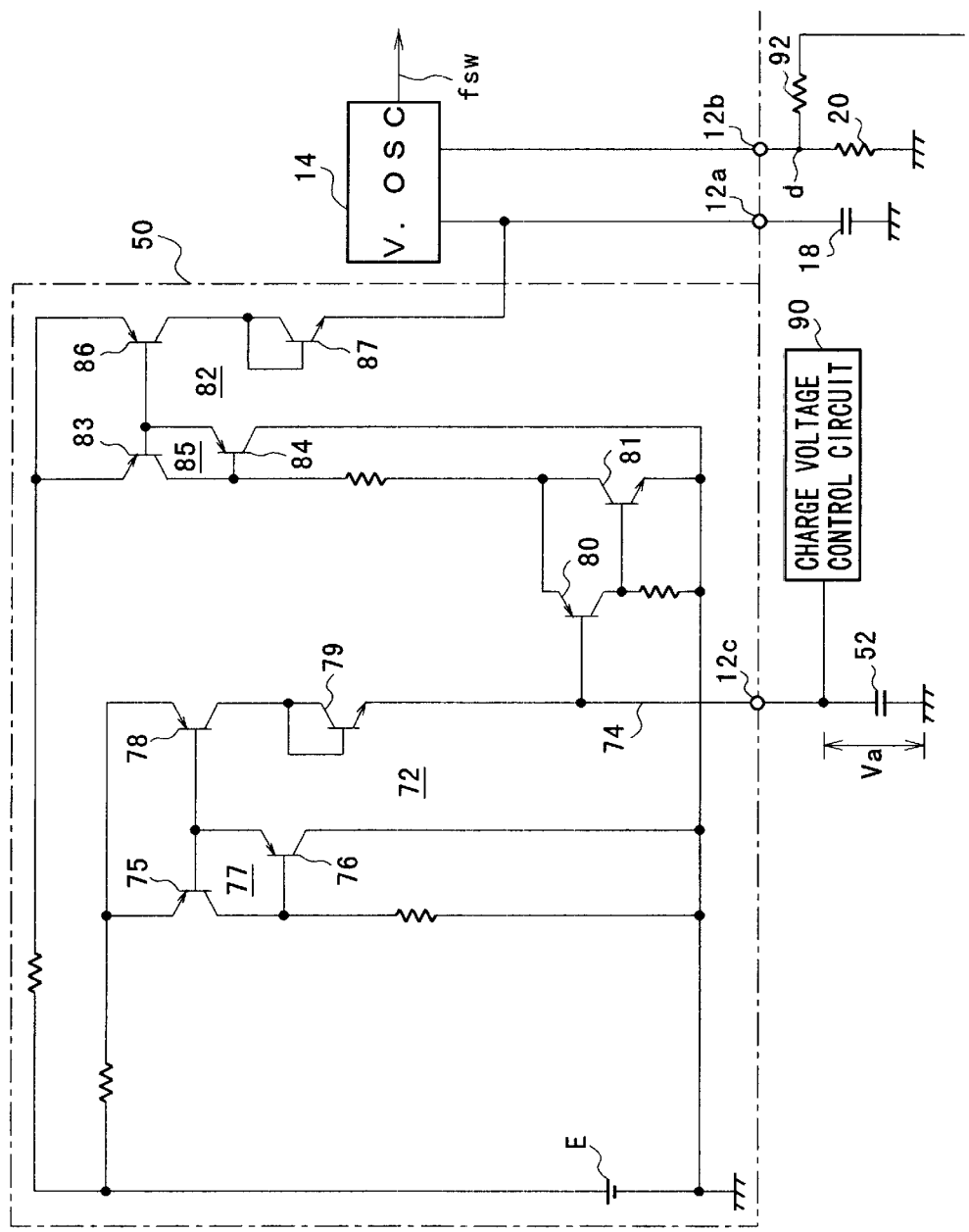
FIG. 5 is a connection diagram showing an example of a soft start circuit used in a switching power supply apparatus embodying the present invention.

FIG. 4 shows a switching power supply apparatus 10 embodying the present invention when a soft start circuit 50 is used. An arrangement of the soft start circuit 50 will now be described here according to FIG. 5.

In the soft start circuit 50, a current path 74 of a first current mirror circuit 72 for charging a capacitor 52 at a constant current is connected to the capacitor 52. The first current mirror circuit 72 comprises a constant current portion 77 composed of a pair of transistors 75 and 76, a third transistor 78 connected to a base of the transistor 75 and a diode (composed of transistor) 79 for preventing back flow. A current identical to the current that flows in the constant current portion 77 flows in the capacitor 52 via the diode 79 with the capacitor 52 being charged at a constant current. Thus, the charge voltage Va with the capacitor 52 indicates linear charge characteristics.

A second current mirror circuit 82 is connected to the current path 74 via a pair of transistors 80 and 81 that are Darlington-connected, which may determine the value of a constant current that flows in a second constant current portion 85. The second current mirror circuit 82 is also arranged similar to the first constant current portion 72. This circuit comprises a constant current portion 85 composed of a pair of transistors 83 and 84, a third transistor 86 connected to a base of the transistor 83 and a diode (composed of transistor) 87 for preventing back flow. A current identical to the current that flows in the constant current portion 85 flows in the capacitor 18 via the diode 87. Thus, the charge characteristics of the capacitor 18 are controlled according to those of the charge voltage Va. As a result, the oscillation frequency 'fsw' of the variable frequency oscillating circuit 14 is controlled as desired, and a soft start mode is achieved.

According to the present invention, there is also provided frequency control means for the variable frequency oscillating circuit 14. In the illustrative embodiment, charge characteristics of the charge capacitor 52 provided at the soft start circuit 50 is controlled, thereby obtaining a control signal for controlling the oscillation frequency.

An oscillation frequency control circuit comprises the soft start circuit 50, the charging capacitor 52 particularly connected to the soft start circuit 50 and a charge voltage control circuit 90 connected to the charging capacitor 52 in the illustrative embodiment of FIG. 4. The circuit 90 has nonlinear charge voltage characteristics relevant to the capacitor 52.

This circuit 90 has a pair of resistors 91 and 92 connected in series as shown in FIG. 4, and its connection neutral point 'd' is connected to an external terminal 12c. Namely, the resistor 92 is connected in parallel to the capacitor 52. A switching transistor 94 is further connected between this connection neutral point 'd' and a power supply Vcc through resistor 93. The partial pressure voltage caused by a pair of resistors 95 and 96 is applied to the transistor 94 as its base voltage.

According to the thus configured charge voltage control circuit 90, the capacitor 52 is charged from a time when the power is ON, and thus, a soft start mode starts. When the power is ON, the transistor 94 is turned ON. At this time, the capacitor 52 is charged by the charge current from the current path 74 and the charge current determined depending on the values of the resistors 91, 92, and 93 (indicated by straight line Pa1 in FIG. 6). When a certain degree of power is charged, an emitter voltage of the transistor 94 rises, whereby the transistor 94 is cut off. Therefore, subsequently, the capacitor 52 is charged by the charge current from the current path 74 and the charge current determined depending on the values of the resistors 91 and 92 (indicated by straight line Pa2 in FIG. 6).

Figure 6:
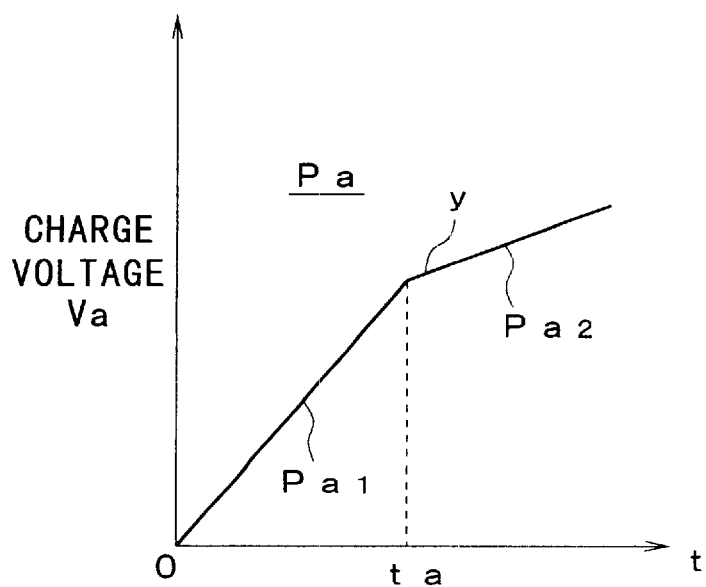
FIG. 6 is a characteristic view showing charge characteristic of a charge voltage control circuit.

As a result, a shown in FIG. 6, the charge characteristics Pa relevant to the capacitor 52 differ before and after a transition point 'y' at a point 'ta' at which the transistor 94 is cut off as shown in FIG. 6 while the transition point is defined as a reference. Namely, a straight line 'Pa1' is obtained until the transistor 94 has been cut off, and then, the straight line 'Pa2' with its gentler gradient than the line 'Pa1' is obtained after the transistor has been cut off. Therefore, comparatively rapid charging is performed up to the point 'ta' when the transistor 94 is cut off (provided if a small amount of current is produced). In contrast, after the transistors 94 have been cut off, gentle charging is performed. Namely, there is provided nonlinear charge characteristics having one transition point.

A relationship between the primary current 'i1' and the output voltage Vb when the nonlinear characteristics are obtained will be described with reference to FIGS. 3A to 3E.

Figure 3A:
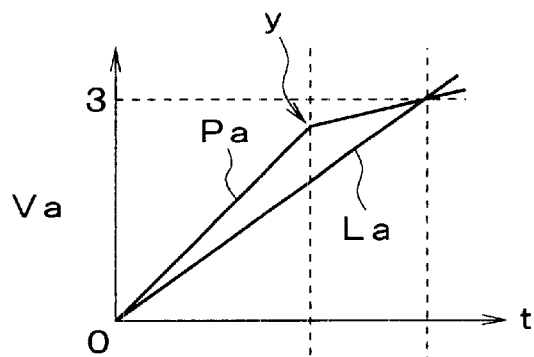
FIGS. 3A to 3E are waveform charts provided for a description of operation of the switching power supply apparatus.

The curve Pa shown in FIG. 3A indicates charge characteristics relevant to the capacitor 52. In the variable frequency oscillating circuit 14, its oscillation frequency 'fsw' varies depending on the charge voltage Va of the capacitor 52 associated with the soft start circuit 50 connected to the oscillating circuit 14. There are provided characteristics in which oscillation frequency 'fsw' also changes almost nonlinearly. When the charge voltage Va is zero volt, oscillation occurs at a high frequency as indicated by straight line 'Pb' shown in FIG. 3B and the oscillation frequency 'fsw' is lowered as the charge voltage Va increases. The frequency change rate, however, differs before and after the transition point 'y'. Since the frequency change rate after the transition point 'y' is smaller than that before the transition point, the oscillation frequency 'fsw' changes gently at a timing when a soft start mode terminates.

Figure 2:
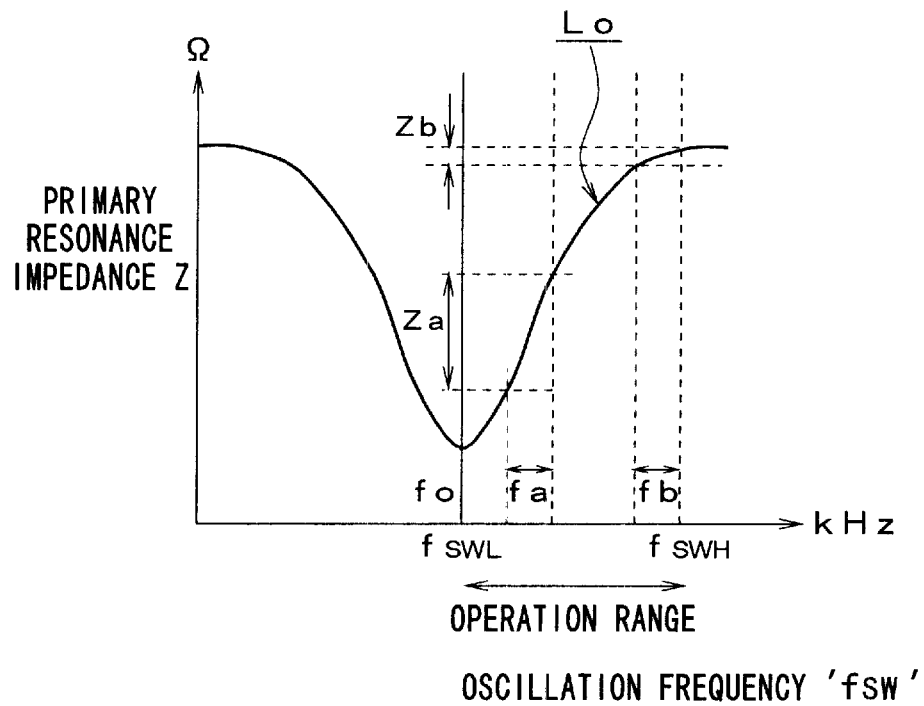
FIG. 2 is a characteristic view showing a relationship between an oscillation frequency and impedance that show primary resonance impedance characteristics.
Figure 3B:
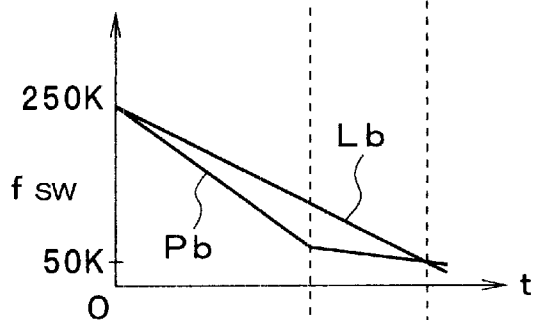
Figure 3C:
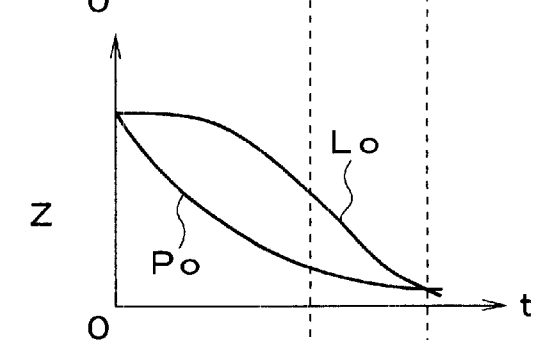

The primary resonance impedance Z of the insulation transformer 26 changes according to this change in oscillation frequency 'fsw', as shown in FIG. 3C. In this resonance impedance Z, there are provided nonlinear characteristics such that the impedance change rate is originally small where the oscillation frequency (switching signal) 'fsw' is high as indicated by the curve 'Lo' shown in FIG. 2, and the impedance change rate is great where the oscillation frequency 'fsw' is comparatively low. However, since the change in oscillation frequency indicates nonlinear characteristics as shown in FIG. 3B, the impedance Z conversely indicates almost linear change as indicated by the curve Po.

Figure 3D:
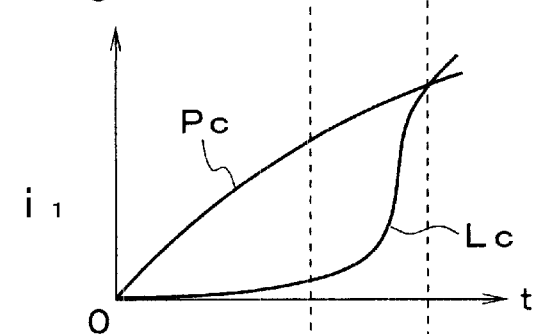

As a result, the primary current 'i1' also changes almost linearly as indicated by the curve Pc shown in FIG. 3D. Namely, although a change rate of a current that flows is different from another, there are provided almost linear current characteristics before and after the transition point 'y'. This prevents a current from rapidly flowing in the primary coil 26a.

Figure 3E:
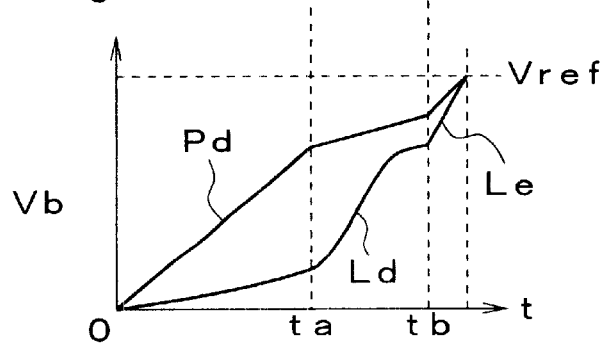

Due to the current characteristics, it is found that the charge voltage Va relevant to the capacitor 52 be charged linearly even before and after the transition point 'y' as indicated by the curve Pd in FIG. 3E.

The charge characteristics relevant to the capacitor 52 is thus made nonlinear, and the frequency of the variable frequency oscillating circuit 14 is controlled so as not to cause the frequency change to be partially rapid, whereby the current that flows in the primary coil 26a of the insulation transformer 26 can be limited linearly. In this manner, a current that flows in a pair of switching elements 22 and 24 is made gentle, and the damage to the switching elements 22 and 24 can be significantly reduced.

In addition, the aforementioned output voltage Vb can be changed according to the charge characteristics of the capacitor 52. When design is made in consideration of the position of the transition point 'y' or a gradient of the charge characteristics before and after the transition point 'y', there can be achieved a voltage change state that is the most suitable to a load to be connected to the output terminal 34 when the power is turned ON. As a result, there can be achieved characteristics on an output voltage rise suitable to the load, and more stable circuit operation can be obtained.

Figure 1:
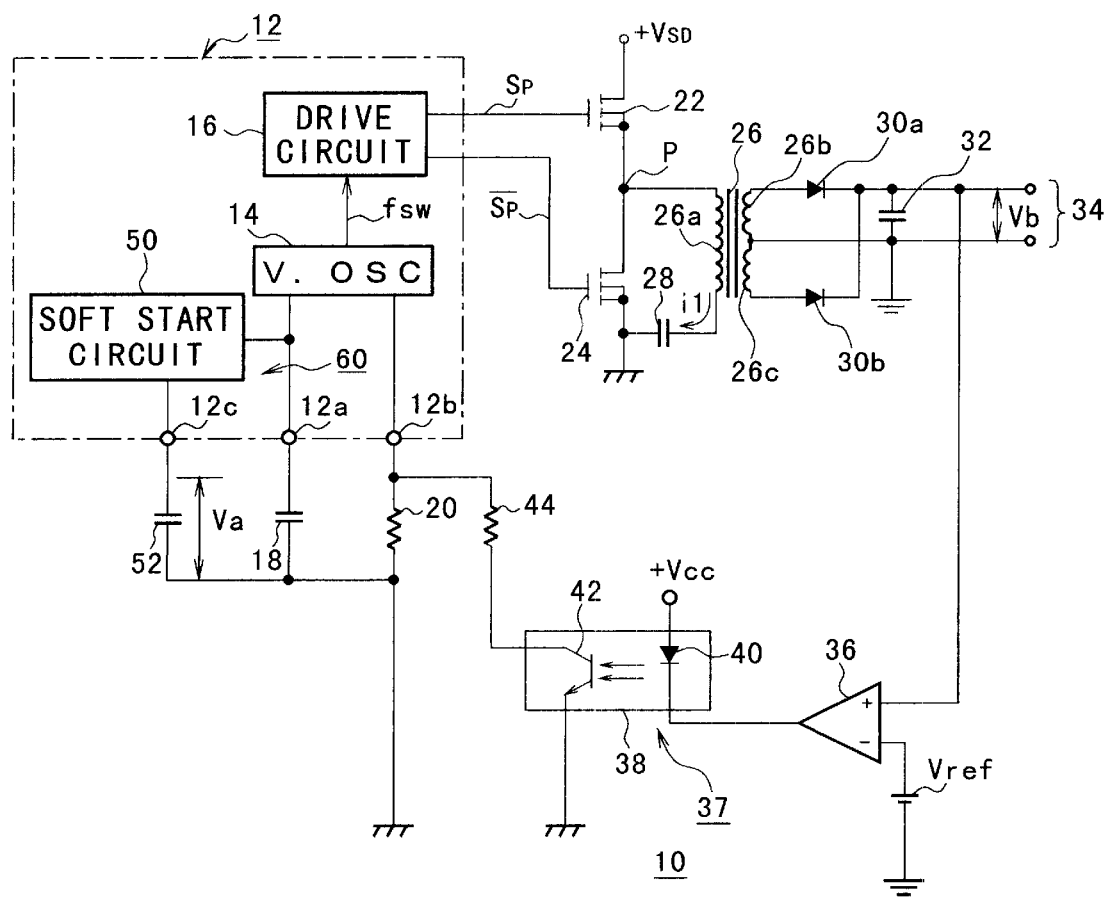
FIG. 1 is a connection diagram showing a conventional switching power supply apparatus.
Figure 7:
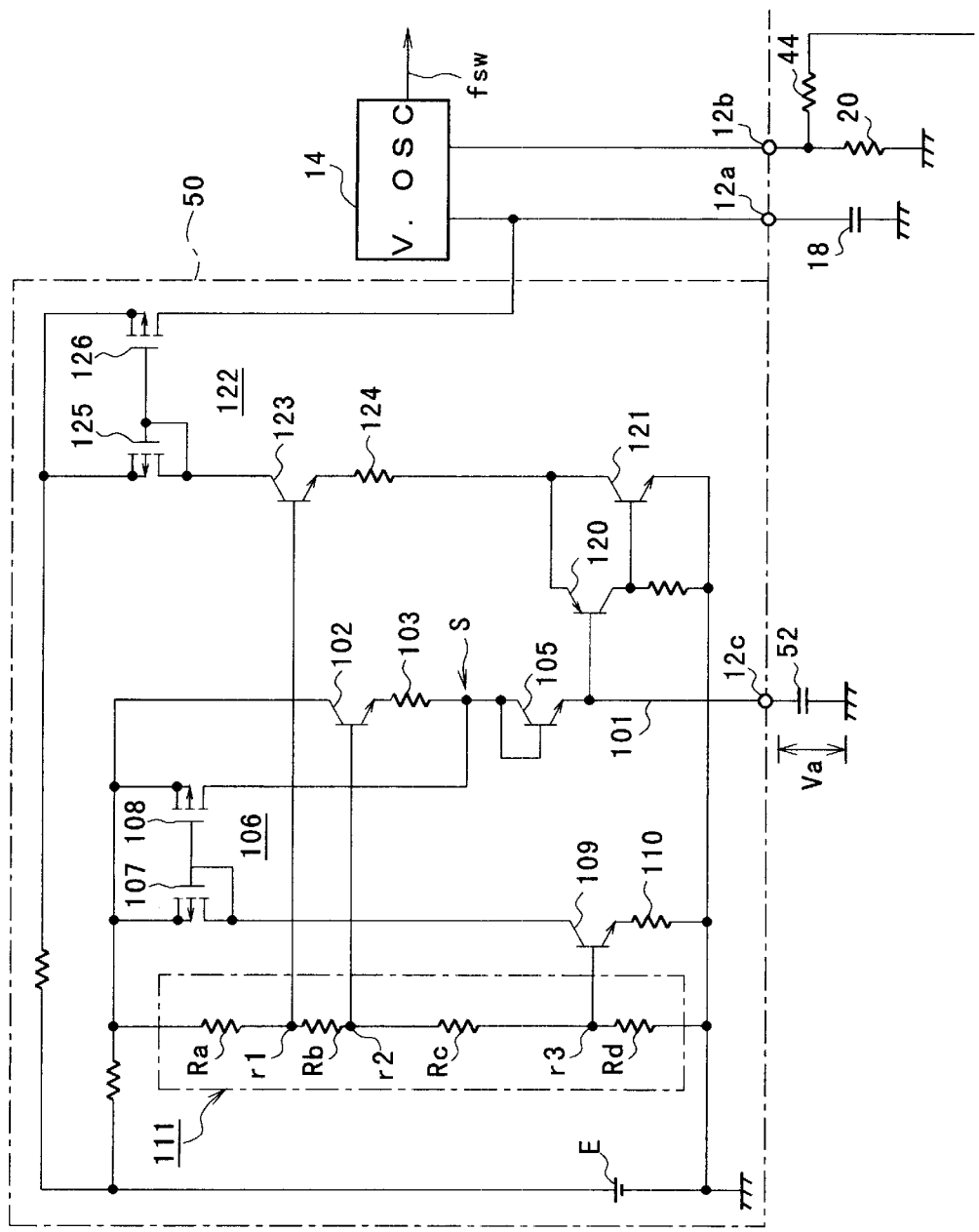
FIG. 7 is a connection diagram showing essential portion of another example of a soft start circuit used in a switching power supply apparatus embodying the present invention.

The soft start circuit 100 can be also arranged as another example shown in FIG. 7. In this example, charge voltage control means relevant to the capacitor 52 is not arranged as an external circuit, but the means is arranged as an IC circuit directly incorporated in switch signal generating means 12. Therefore, in this case, the charge voltage control circuit 90 shown in FIG. 1 is not required.

In the soft start circuit 50 shown in FIG. 7, a current path 101 relevant to a DC power source 104 is connected to the capacitor 52. To this current path 101, a switching transistor 102 is connected in series via a resistor 103 and a diode (composed of transistor) 105 for preventing back flow. Further, A first current mirror circuit 106 supplies a constant current to a neutral point 's' of connection between the resistor 103 and the diode 105.

The first current mirror 106 comprises a MOS transistor 107 as a constant current source and a MOS transistor 108 connected to a gate of the transistor 107. A transistor 109 for determining the value of the constant current is connected to the MOS transistor 107 via a resistor 110. At the transistor 109, the minimum partial pressure voltage obtained at the neutral point 'r3' of connection of a partial pressure circuit 111 made of a plurality of resistors Ra to Rd is supplied to a base of the transistor 109. The partial pressure circuit 111 applies an intermediate partial pressure voltage obtained at the connection neutral point 'r2' to the switching transistor 102 connected to the current path 101.

A pair of transistors 120 and 121 that are Darlington-connected amplifies a current flowing in the current path 101. The amplified current is used as a current that flows in a constant current source 125 of a second current mirror circuit 122. Therefore, this current path is connected to the constant current portion 125 that configures the second current mirror circuit 122 via a switching transistor 123 and a resistor 124. At the transistor 123, the maximum partial pressure voltage obtained at the neutral point 'r1' of connection of the partial pressure circuit 111 is supplied to a base of the transistor 123.

In this embodiment, there is provided an arrangement in which the capacitor 18 that determines the aforementioned oscillation frequency is charged with the current flowing in the other transistor 126 of the second current mirror 122.

With this circuit configuration, the circuit configuration from the switching transistor 102 connected to the current path 101 to the first current mirror circuit 106 functions as charge voltage control means. Therefore, when the power is ON, the capacitor 52 is charged with the current made by composing the constant current that flows in the transistor 108 and a current that flows in the transistor 102. Due to the charging, the terminal voltage Va of the capacitor 52 rises, and a potential of the connection neutral point 's' rises, then the potential becomes higher than a base potential of the transistor 102. Thus, this transistor 102 is cut off. As the result, the capacitor 52 is charged with only a constant current from the first current mirror 106.

Therefore, the voltage change rate of the charge voltage before the transistor 102 is cut off differs from that after it is cut off. Namely, the voltage change rate after the transistor 102 is cut off is smaller than that before cut off, and the charge characteristics similar to those shown in FIG. 6 are obtained.

Since a change in the charge current identical to this charge characteristics is also transmitted to the second current mirror circuit 122, the charge characteristics relevant to the capacitor 18 that determines an oscillation frequency is also provided as nonlinear characteristics having a transition point 'y' as shown in FIG. 6. Therefore, nonlinear characteristics similar to the cases of FIGS. 3A to 3E can be achieved.

The nonlinear characteristics relevant to the soft start circuit 50 can be provided in a way other than the aforementioned method. In addition, in the aforementioned embodiments, a voltage change rate as nonlinear characteristics is expressed by a single transition point. However, the nonlinear characteristics can be achieved by a pure curve, and nonlinear characteristics having a plurality of transition points can be provided.

In the illustrative embodiments, although the present invention is applied to a switching power supply apparatus having an SEPP configuration, it can be applied to a push-pull type switching power supply apparatus or a half-bridge configured switching power supply apparatus.

The invention claimed is:

1. A switching power supply apparatus comprising:

switching signal generating means having a variable frequency oscillating circuit for generating an switching signal;

a pair of switching elements for receiving the switching signal from the switching signal generating means;

a resonating capacitor connected to a connection point of the pair of switching elements via a primary coil of a transformer;

a rectifying circuit provided at a secondary coil of said transformer and producing an output voltage;

a comparison means for comparing the output voltage from the rectifying circuit with a reference voltage;

impedance control means for controlling an impedance of an oscillation element of said variable frequency oscillating circuit based on a comparison output from said comparison means; and frequency control means for controlling an oscillation frequency of said switching signal when said variable frequency oscillating circuit is initially driven, wherein a frequency control signal of said frequency control means has non-linear characteristics relative to time.

2. The switching power supply apparatus as claimed in claim 1, wherein said frequency control means comprises a soft start circuit during startup, a charging capacitor and charge voltage control means connected to both ends of the charging capacitor, wherein nonlinear charge characteristics allows a frequency control signal output from said soft start circuit to have nonlinear characteristics.

3. The switching power supply apparatus as claimed in claim 2, wherein said charge voltage control means has charge characteristics having at least one transition point relevant to a startup time of said variable frequency oscillating circuit, and wherein charge characteristics after said transition point are gentler in gradient than charge characteristics before said transition point.

4. The switching power supply apparatus as claimed in claim 2, wherein said charge voltage control means comprises first and second resistors connected in series to a power supply and a ground, and a third resistor connected in parallel to the first resistor via a switching transistor, and wherein said charging capacitor is connected between a neutral point of said first and second resistors.

5. The switching power supply apparatus as claimed in claim 4, wherein said soft start circuit connected to said charging capacitor comprises a constant current source to charge said charging capacitor; and wherein turning ON/OFF the switching transistor allows charge characteristics for said charging capacitor to be nonlinear.

* * * * *